March 10, 1959    C. E. POYNTER    2,876,682
BROACHING MACHINES
Filed Aug. 7, 1956            2 Sheets-Sheet 1
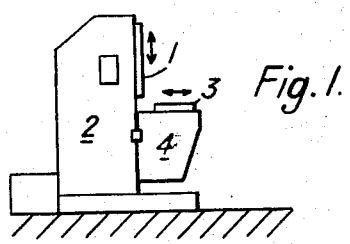
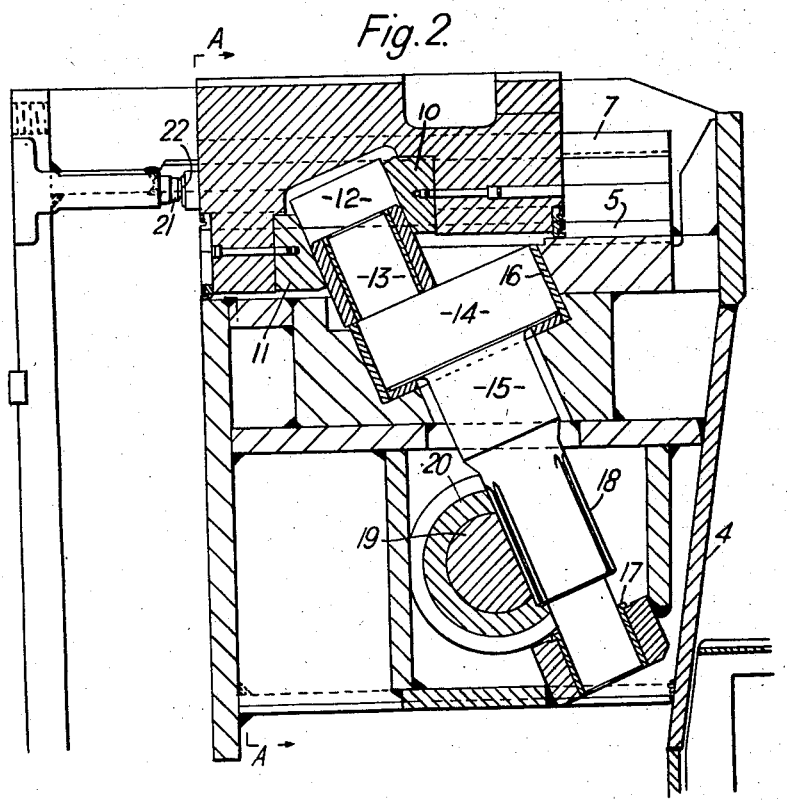
Inventor
CYRIL E. POYNTER
By

2,876,682

Patented Mar. 10, 1959

2,876,682

BROACHING MACHINES

Cyril Edward Poynter, Biggleswade, England, assignor to Weatherley Oilgear Limited, Biggleswade, England Application August 7, 1956, Serial No. 602,604

Claims priority, application Great Britain August 17, 1955

1 Claim. (Cl. 90—33)

This invention relates to surface broaching machines of the type having a reciprocating tool slide which carries at least one broaching tool and a work supporting table which is reciprocated at intervals, for loading and unloading of work to be broached.

In some such machines the work table is withdrawn from operative position after a single stroke of the tool slide and in other machines the work table is withdrawn after a double stroke of the slide which removes material from the work upon both strokes.

Shuttle-type work tables are normally supported from the main frame of the machine in a sub-assembly by means of guides along, or between, which the table slides as it is shuttled into and out of operative position.

The running clearances between the guides on the machine frame sub-assembly and the work table are usually in the region of .001 to .004 inch. This means that the sliding work table, which carries the component to be broached can float in the guides of the machine and, on account of this, it is often impossible to broach accurately and consistently when the tolerances of broaching on the component are as close as .0005 inch.

It is the object of the invention to provide a broaching machine in which the inaccuracies occasioned by the necessary running clearance between the guides and the work table are obviated whether the tool slide operates on one only or on both of its strokes.

With the above object in view the invention provides a broaching machine having a work table which can be shuttled into and out of operative position, and means operative upon the table to apply an appreciable load to the work table when in its operative position in a sense to take up the necessary clearance between the table and guides within which it runs.

The force applied may be directed at right angles to the face of the guides or at any other appropriate angle, and may be applied by mechanical or hydraulic means.

In a preferred form of the invention the force taking up the running clearance is applied by mechanical means having a dead central solid stop. This may be achieved for example by the use of a crank motion, toggle motion or wedge and slipper motion or where convenient by a flat plate spring fitted with an adjustable screw.

Ordinarily the work tables of machines according to the invention are provided with jig fixtures by which the work to be machined is accurately located relative to the table, and stops fitted to the machine frame with micro accuracy are provided to ensure that the forward or operative position of the table can be accurately repeated.

In one preferred form of the invention a crank mechanism offset from the normal is used both to provide a shuttling movement of the table and the desired force to take up running clearances.

The above and other parts of the invention are embodied in a preferred form of machine which will now be described in some detail by way of example with reference to the accompanying drawings in which:

Fig. 1 is a diagrammatic side elevation of a broaching machine,

Fig. 2 is a central vertical section through a work table and its support as used in a machine such as shown in Fig. 1.

Figure 3:
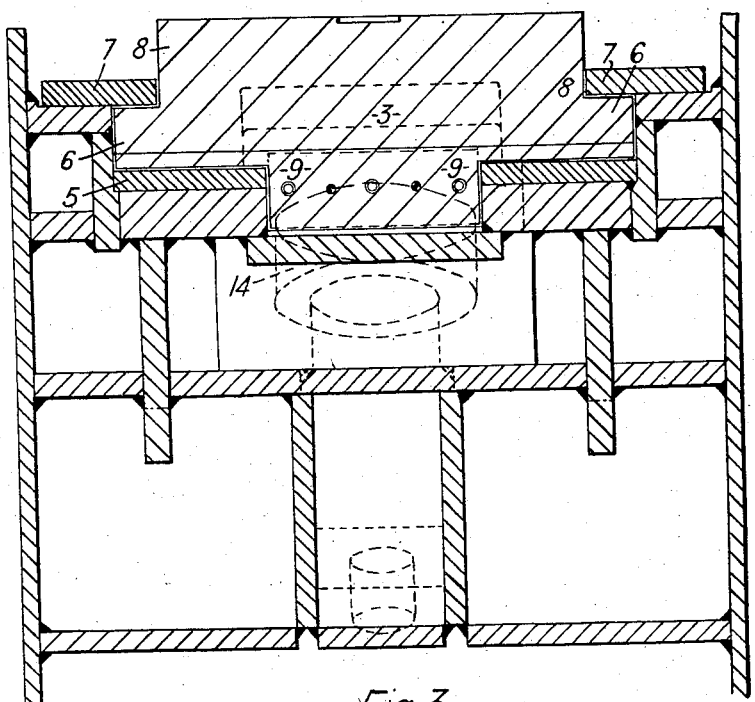
Fig. 3 is an end view on the line A—A of Fig. 2.

A vertical stroke surface broaching machine has a tool slide 1 (Fig. 1) mounted in the main machine frame 2 for vertical reciprocation, and a work table 3 adapted to be shuttled in and out of operative position mounted in a sub-assembly 4 of substantial proportions fixed to the main frame.

The work table 3 slides upon a pair of wear plates 5 (Fig. 3) and has protruding flanges 6 at its sides which are engaged by further guides 7 on their upper faces. Running clearances of from .001 to .004 inch are provided between the flanges 6 of the table and the guides 7.

An upstanding rectangular sectioned portion 8 of the table and a dependent rectangular sectioned portion 9 of the table running between end faces of the guide plates 7 and the wear plates 5, respectively, ensure lateral alignment.

The lower dependent part of the table is provided with a pair of guides 10 and 11 (Fig. 2) of substantial size which between them define a transverse slot 12 offset from vertical towards the tool slide at its upper end by some 22½° and this slot is open at its lower edge.

The slot in the table is engaged by a substantial crank pin 13 fitted to a collar 14 at the end of a crank shaft 15 journalled in guide bearings 16 and 17 supported in the sub-assembly 4.

This crank shaft is also offset from the vertical by some 22½° and is formed intermediate its ends with pinion teeth 18 engaged by a hydraulically operated rack 19 sliding within suitable guide bearings 20. Any convenient hydraulically operated arrangement may be employed for driving the rack 19, and suitable hydraulic rack-driving means is shown in the patent to Grad, No. 2,372,825, April 3, 1945.

The crank pin 13 is free to swing up and down while sliding within the slot 12 formed in the lower extension of the table so that a part rotation of the crank shaft will cause the table to slide to and fro in its guides.

A pair of micro-accurately fitted stops, one of which 21 is shown in Fig. 2, are provided on the main machine frame 2 to engage faces 22 (Fig. 2) fixed to the end face of the table, whereby the forward position of the table is accurately fixed.

The crank is so arranged in relation to the table that the crank pin 13 is in near dead centre position when the faces 22 on the table engage the stops 21 on the frame.

Since the inclination of the crank shaft and the slot in the table is towards the main frame from their lower ends a very substantial downwards force can be applied by the crank pin to the table when the table is in its operative position against the stops. This force is sufficient to take up all running clearances between the work table and the guides and maintain it with absolute rigidity against possible tilting or shuddering in either vertical or horizontal senses.

It will be appreciated that a very large force both in towards the main frame and down against the table guides may be achieved for a moderate expenditure of power by using a near dead centre mechanism, and this force may be made large enough to withstand the reaction of machining of a work piece fitted to the work table where the tool slide is operative upon the work on either upward or downward strokes.

It will be understood that the invention is not restricted to the details of the specific embodiment described which may be varied without departing from the scope of the following claim.

I claim:

A broaching machine comprising a reciprocal broaching tool bar, guides disposed substantially perpendicularly to the path of said bar, a work table slidable in said guides, and a crank mechanism including a crank pin connected with said table for moving said table along said guides into and out of operative position relative to said bar, said crank pin being disposed at an acute angle to the face of said guides and operative upon said table when said table is in operative position to press said table against said guides to take up the necessary clearance therebetween.

References Cited in the file of this patent

UNITED STATES PATENTS

| | | |
|---|---|---|
| 2,372,825 | Grad | Apr. 3, 1945 |
| 2,405,434 | Krainer | Aug. 6, 1946 |
| 2,551,237 | Berthiez | May 1, 1951 |